United States Patent
Fu

(10) Patent No.: US 11,223,042 B2
(45) Date of Patent: Jan. 11, 2022

(54) LITHIUM-INTERCALATED TITANIUM DIOXIDE, LITHIUM TITANATE PARTICLES MADE THEREFROM, AND RELATED METHODS

(71) Applicant: Tronox LLC, Oklahoma City, OK (US)

(72) Inventor: Guoyi Fu, Ellicott City, MD (US)

(73) Assignee: TRONOX LLC, Oklahoma City, OK (US)

(*) Notice: Subject to any disclaimer, the term of this patent is extended or adjusted under 35 U.S.C. 154(b) by 985 days.

(21) Appl. No.: 14/230,435

(22) Filed: Mar. 31, 2014

(65) Prior Publication Data

US 2015/0280231 A1 Oct. 1, 2015

(51) Int. Cl.
*H01M 4/485* (2010.01)
*H01M 4/02* (2006.01)
(Continued)

(52) U.S. Cl.
CPC .......... *H01M 4/485* (2013.01); *C01G 23/005* (2013.01); *H01M 4/131* (2013.01);
(Continued)

(58) Field of Classification Search
None
See application file for complete search history.

(56) References Cited

U.S. PATENT DOCUMENTS

| | | |
|---|---|---|
| 4,012,338 A | 3/1977 | Urwin |
| 4,882,128 A | 11/1989 | Hukvari et al. |

(Continued)

FOREIGN PATENT DOCUMENTS

| | | |
|---|---|---|
| DE | 102008026580 | 12/2009 |
| EP | 2612840 | 7/2013 |

(Continued)

OTHER PUBLICATIONS

"Solid-state synthesis of 70 nm Li4Ti5O12 particles by mechanically activating intermediates with amino acids" published by Matsui et al. J. Am. Ceram. Soc., 91 (5) 1522-1527(2008).*

(Continued)

*Primary Examiner* — Basia A Ridley
*Assistant Examiner* — Heng M. Chan
(74) *Attorney, Agent, or Firm* — McAfee & Taft

(57) ABSTRACT

The invention provides a method for preparing lithium-containing particles suitable for use in an electrode of a battery, the method including forming a mixture comprising titanium dioxide precursor particles and an aqueous solution of a lithium compound; and heating the mixture at elevated temperature in a sealed pressure vessel in order to form lithium-inserted titanium dioxide particles, wherein at least one particle size characteristic selected from average primary particle size, particle size distribution, average intra-particle pore size, average inter-particle pore size, pore size distribution, and particle shape of the titanium dioxide particles is substantially unchanged by said heating step. The invention further includes a battery including a first electrode, a second electrode, and a separator including an electrolyte between the first and second electrodes, wherein one of the first and second electrodes comprises lithium-inserted titanium dioxide particles or lithium titanate spinel particles made according to the invention.

23 Claims, 5 Drawing Sheets

(51) Int. Cl.
  *H01M 10/0525* (2010.01)
  *C01G 23/00* (2006.01)
  *H01M 4/131* (2010.01)
(52) U.S. Cl.
  CPC ..... *H01M 10/0525* (2013.01); *C01P 2002/60* (2013.01); *C01P 2002/72* (2013.01); *C01P 2004/03* (2013.01); *C01P 2004/04* (2013.01); *C01P 2004/32* (2013.01); *H01M 2004/021* (2013.01); *H01M 2004/027* (2013.01)

(56) References Cited

U.S. PATENT DOCUMENTS

| | | | |
|---|---|---|---|
| 6,645,673 | B2 | 11/2003 | Yamawaki et al. |
| 6,827,921 | B1 | 12/2004 | Singhal et al. |
| 6,890,510 | B2 | 5/2005 | Spitler et al. |
| 7,368,097 | B2 | 5/2008 | Sterzel |
| 2005/0175525 | A1 | 8/2005 | Fu et al. |
| 2009/0062111 | A1 | 3/2009 | Fu et al. |
| 2009/0324472 | A1 | 12/2009 | Fu et al. |
| 2011/0189545 | A1 | 8/2011 | Holzapfel et al. |
| 2013/0012229 | A1 | 5/2013 | Fu et al. |
| 2013/0244114 | A1 | 9/2013 | Yamamoto et al. |
| 2013/0337302 | A1 | 12/2013 | Inagaki et al. |
| 2013/0343983 | A1 | 12/2013 | Ito et al. |
| 2014/0308200 | A1* | 10/2014 | Sun .................. C01D 15/02 423/598 |

FOREIGN PATENT DOCUMENTS

| | | | |
|---|---|---|---|
| RU | 2010150909 | | 6/2012 |
| SU | 1585294 | | 8/1990 |
| WO | WO 2010-031363 | | 3/2010 |
| WO | WO-2013002729 | A1 * | 1/2013 ........... C01G 23/005 |

OTHER PUBLICATIONS

"Polyol-mediated synthesis of Li4Ti5O12 nanoparticles and its electrochemical properties" published by Kim et al. Electrochemistry Communications 7 (2005) 1340-1344.*

Lu et al. "Single crystalline lithium titanate nanostructure with enhanced rate performance for lithium ion battery" Journal of Power Sources 202 (2012) 246-252.*

Shen et al. "Controlling Size, Crystallinity, and Electrochemical Performance of Li4Ti5O12 Nanocrystals" Chem. Mater. 2013, 25, 24, 5023-5030.*

Nakahara et al., "Preparation of particulate $Li_4Ti_5O_{12}$ having excellent characteristics as an electrode active material for power storage cells", *Journal of Power Sources*, 2003, pp. 131-136, vol. 117, No. 1-2, Tomiha et al., "Hydrothermal synthesis of alkali titanates from nano size titania powder", Journal of Materials Science, 2002, pp. 2341-2344, vol. 37, No. 11.

Ukranian Office Action received in corresponding UA Patent Application No. A201610813 dated Sep. 10, 2019, pp. 1-11.

Hui Yan, et al., "Hydrothermal Synthesis of Spherical Li4Ti5O12 Anode Material for High-Power Lithium Ion Secondary Batteries," Journal of Physical Chemistry, 27(9): 2118-2122, Sep. 30, 2011.

Wenshui Qiu, et al., "φ-pH Diagram of Li-Ti-H2O System and Synthesis of Li4Ti5O12 at 298.15K," Chinese Journal of Nonferrous Metals, 20(11): 2260-2268, Nov. 30, 2010.

Chinese Office Action received in corresponding CN Patent Application No. 201580028526.3 dated Jun. 16, 2020, pp. 1-6.

Guiling Ning, et al., "Advanced Inorganic Synthesis" (Chinese), East China University of Science and Technology Press, 2007, p. 61, Sep. 30, 2007.

Rujun Xue, et al., "Research on Surface Modification and Physical Properties of Inorganic Nanomaterials" (Chinese), Hefei University of Technology Press, 2009, p. 109, Oct. 31, 2007.

Xiaming Dai, "Practical Treatment Technology of Ultrafine Ceramic Powder" (Chinese), National Defense Industry Press, 2009, p. 117, Sep. 30, 2009.

Yingjie Qiao, "Material Synthesis and Preparation" (Chinese), National Defense Industry Press, 2010, pp. 45 and 16, Apr. 30, 2010.

Chinese Office Action received in corresponding CN Patent Application No. 201580028526.3 dated Apr. 9, 2020, pp. 1-14, Apr. 9, 2020.

European Examination Report received in corresponding EP Patent Application No. 15716649.7 dated May 14, 2020, pp. 1-5.

* cited by examiner

LITHIUM-INTERCALATED TITANIUM DIOXIDE, LITHIUM TITANATE PARTICLES MADE THEREFROM, AND RELATED METHODS

FIELD OF THE INVENTION

The present invention is directed to lithium-intercalated titanium dioxide particles and lithium titanate particles adapted for use in anodes for lithium-ion batteries, as well as methods of forming such particles.

BACKGROUND

Lithium-ion batteries are rechargeable batteries that rely upon movement of lithium ions between electrodes. Such batteries are commonly used in a variety of electronics due to their high energy density, high power density, and quick charge/discharge characteristics. The anode typically consists of graphite and the cathode typically consists of a lithium intercalation material, such as $LiCoO_2$, the electrodes being connected through a liquid electrolyte, such as $LiPF_6$ in a non-aqueous solvent.

There is a need in the art for improved anode materials for use in lithium-ion batteries to replace conventional carbon-based materials, such as graphite, which can in some cases suffer from relatively short cycle lifetimes and relatively long charging times. Lithium titanate having a spinel crystalline structure (i.e., $Li_4Ti_5O_{12}$ otherwise known as LTO) is used with increasing popularity as anode materials in lithium-ion batteries, especially for electric automobile and energy storage applications. Lithium titanate changes to a rock salt crystalline structure as lithium ions are inserted during charge, and changes back to a spinel crystalline structure as lithium ions dissociate. The lithium titanate undergoes far less change in its lattice volume due to charge/discharge as compared to carbon materials, and generates little heat even when shorted to the positive electrode, thereby preventing fire accidents and ensuring a high degree of safety. Additionally, use of lithium titanate as anode material results in longer battery life (rechargeable for more cycles) and shorter charging time (minutes vs. hours).

It is highly desirable for the lithium titanate to be in cubic spinel structure with high crystalline ordering and phase purity in order to produce a high level of performance in lithium-ion batteries. Lithium titanate spinels, like other ceramic materials, may be prepared by conventional solid state reaction processes; that is, mixing together the oxide components and heating or firing the mixture to facilitate the solid state reaction. Due to kinetic limitations of the solid state reactants, high purity phase with uniform particle size and morphology is difficult to achieve. Furthermore, lithium may be lost during heating or firing due to the volatile nature of lithium compounds.

To overcome these limitations, wet chemistry techniques have been proposed that involve one or more lithium or titanium compounds dissolved or suspended in a solvent. However, many of these processes suffer from certain disadvantages, such as lack of reaction control, inhomogeneous reactions, and/or the inability to adequately control particle morphology, particle size, or crystallinity. There remains a need in the art for a method for forming lithium titanate spinel particles of controlled particle size and morphology for use in lithium-ion battery applications.

SUMMARY OF THE INVENTION

The present invention provides methods for forming lithium-containing particles suitable for use in an electrode of a lithium-ion battery. For example, the present invention can provide high quality lithium titanate particles with, advantageously, small particle size (e.g., nanometer size range), narrow particle size distribution, and high crystallinity. The use of lithium-containing particles prepared according to the invention can result, in certain embodiments, in battery electrodes that provide better safety with respect to explosion and fire, longer battery life, and shorter charging time as compared to carbon-based electrodes.

In one aspect, the invention provides a method for preparing lithium-containing particles suitable for use in an electrode of a battery, comprising:

a) forming a mixture comprising titanium dioxide precursor particles and an aqueous solution of a lithium compound; and b) heating the mixture at elevated temperature in a sealed pressure vessel in order to form lithium-inserted titanium dioxide particles, wherein at least one particle size characteristic selected from the group consisting of average primary particle size, particle size distribution, average intra-particle pore size, average inter-particle pore size, pore size distribution, and particle shape of the titanium dioxide particles is substantially unchanged by said heating step.

Typically, at least one of the average primary particle size, the average intra-particle pore size, and the average inter-particle pore size of the lithium-inserted titanium dioxide particles is within about 10 percent (e.g., within about 5 percent) of the same size characteristic of the titanium dioxide precursor particles. In certain advantageous embodiments, both the titanium dioxide precursor particles and the lithium-inserted titanium dioxide particles are characterized by one or more of the following: an average primary particle size of less than about 100 nm; a generally spherical shape; an average intra-particle pore size in the mesopore range; a monodisperse particle size distribution; and a monodisperse intra-particle pore size distribution.

The lithium compound used in the invention can vary, with examples including lithium hydroxide, lithium oxide, lithium chloride, lithium carbonate, lithium acetate, lithium nitrate, and combinations thereof. The elevated temperature is typically at least about 80° C. and the pressure during the heating step is typically autogenous. In certain embodiments, the pH of the mixture is greater than about 9. Typically, the pressure applied to the mixture during the heating step is at least about 20 psig. In one embodiment, the amount of lithium compound in the mixture is between about 2 and about 20 weight percent based on the weight of the titanium dioxide particles.

If desired, the method can further include calcining the lithium-inserted titanium dioxide particles to form lithium titanate spinel particles (e.g., a calcining step comprising heating the lithium-inserted titanium dioxide particles at a temperature of no more than about 650° C.). In certain embodiments, the lithium titanate spinel particles are characterized by one or more of the following: an average primary particle size of less than about 100 nm; an average intra-particle pore size in the mesopore range; a monodisperse particle size distribution; and a monodisperse intra-particle pore size distribution. Advantageously, at least one of the average primary particle size, the average intra-particle pore size, and the average inter-particle pore size of the lithium titanate spinel particles is within about 10 percent of the same size characteristic of the titanium dioxide precursor particles.

In another embodiment, the invention provides a method for preparing lithium-containing particles suitable for use in an electrode of a battery, comprising:

a) forming a mixture comprising titanium dioxide precursor nanoparticles and an aqueous solution of a lithium compound;

b) heating the mixture at a temperature of at least about 80° C. for at least about 2 hours in a sealed pressure vessel at autogenous pressure in order to form lithium-inserted titanium dioxide nanoparticles, wherein at least one particle size characteristic selected from the group consisting of average primary particle size, particle size distribution, average intra-particle pore size, average inter-particle pore size, pore size distribution, and particle shape of the titanium dioxide nanoparticles is substantially unchanged by said heating step; and c) optionally, calcining the lithium-inserted titanium dioxide nanoparticles to form lithium titanate spinel nanoparticles.

In a further embodiment, the invention provides a method for preparing lithium-containing particles suitable for use in an electrode of a battery, comprising:

a) preparing titanium dioxide precursor particles by forming an aqueous solution of a titanium salt and an organic acid, and thermally hydrolyzing the aqueous solution at an elevated temperature, optionally in the presence of a titanium dioxide seed material, to produce titanium dioxide precursor particles in a mother liquor;

b) separating the resulting titanium dioxide precursor particles from the mother liquor;

c) optionally, drying the separated titanium dioxide precursor particles;

d) forming a mixture comprising the titanium dioxide precursor particles and an aqueous solution of a lithium compound;

e) heating the mixture at a temperature of at least about 80° C. for at least about 2 hours in a sealed pressure vessel at autogenous pressure in order to form lithium-inserted titanium dioxide particles, wherein at least one particle size characteristic selected from the group consisting of average primary particle size, particle size distribution, average intra-particle pore size, average inter-particle pore size, pore size distribution, and particle shape of the precursor titanium dioxide precursor particles is substantially unchanged by said heating step; and f) optionally, calcining the lithium-inserted titanium dioxide particles to form lithium titanate spinel particles.

In another aspect, the invention provides a battery (e.g., a lithium-ion battery) comprising a first electrode, a second electrode, and a separator comprising an electrolyte between the first and second electrodes, wherein one of the first and second electrodes comprises lithium-inserted titanium dioxide particles or lithium titanate spinel particles made according to any of the above-noted processes.

In yet another aspect, the invention provides a battery (e.g., a lithium-ion battery) comprising a first electrode, a second electrode, and a separator comprising an electrolyte between the first and second electrodes, wherein one of the first and second electrodes comprises lithium-inserted titanium dioxide particles. The lithium-inserted titanium dioxide particles are characterized, for example, by one or more of the following: an average primary particle size of less than about 100 nm; a generally spherical shape; an average intra-particle pore size in the mesopore range; a monodisperse particle size distribution; and a monodisperse intra-particle pore size distribution.

In a still further aspect, the invention provides lithium-inserted titanium dioxide nanoparticles comprising between about 1 and about 12 weight percent lithium, based on the total weight of the lithium-inserted titanium dioxide nanoparticles, wherein the lithium-inserted titanium dioxide nanoparticles are characterized by one or more of the following: a generally spherical shape; an average intra-particle pore size in the mesopore range; a monodisperse particle size distribution; and a monodisperse intra-particle pore size distribution. In one embodiment, the lithium-inserted titanium dioxide nanoparticles are characterized by a generally spherical shape and a monodisperse particle size distribution, wherein the nanoparticles have an average primary particle size of no more than about 80 nm and a monodispersity of particle size such that all particles have a primary particle size within about 10 percent of the average primary particle size.

Still further, the invention provides lithium titanate spinel nanoparticles characterized by one or more of the following: an average intra-particle pore size in the mesopore range; a monodisperse particle size distribution; and a monodisperse intra-particle pore size distribution. In certain embodiments, the lithium titanate spinel nanoparticles have an average particle size of no more than about 80 nm and a monodispersity of particle size such that all particles have a primary particle size within about 10 percent of the average primary particle size. Such lithium titanate spinel nanoparticles can be used in a battery (e.g., a lithium-ion battery) comprising a first electrode, a second electrode, and a separator comprising an electrolyte between the first and second electrodes, wherein one of the first and second electrodes comprises the lithium titanate spinel nanoparticles.

BRIEF DESCRIPTION OF THE DRAWINGS

Figure 1:
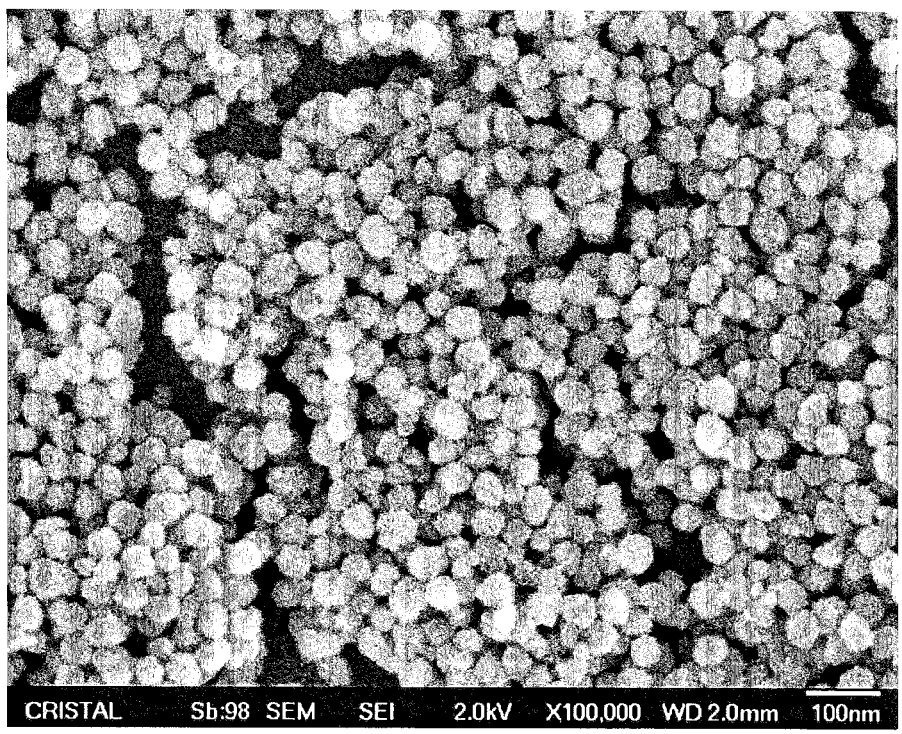
Figure 2:
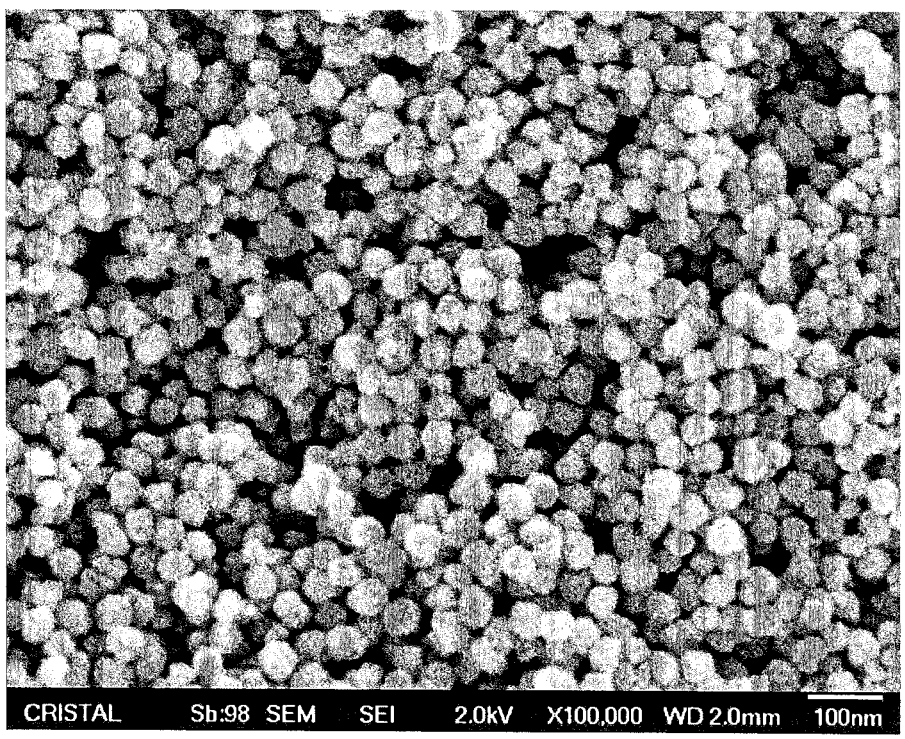
Figure 3:
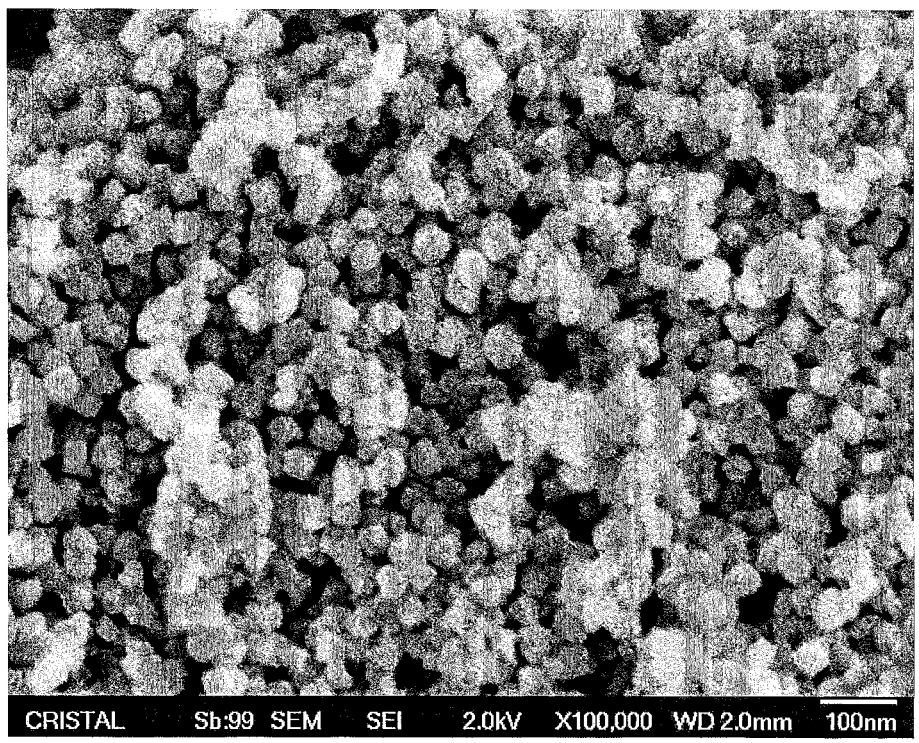
Figure 4A:
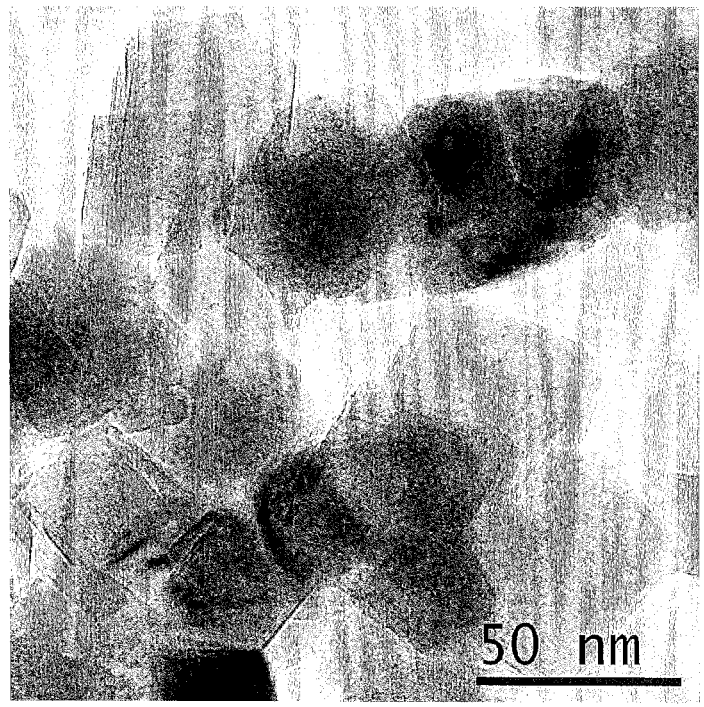
Figure 4B:
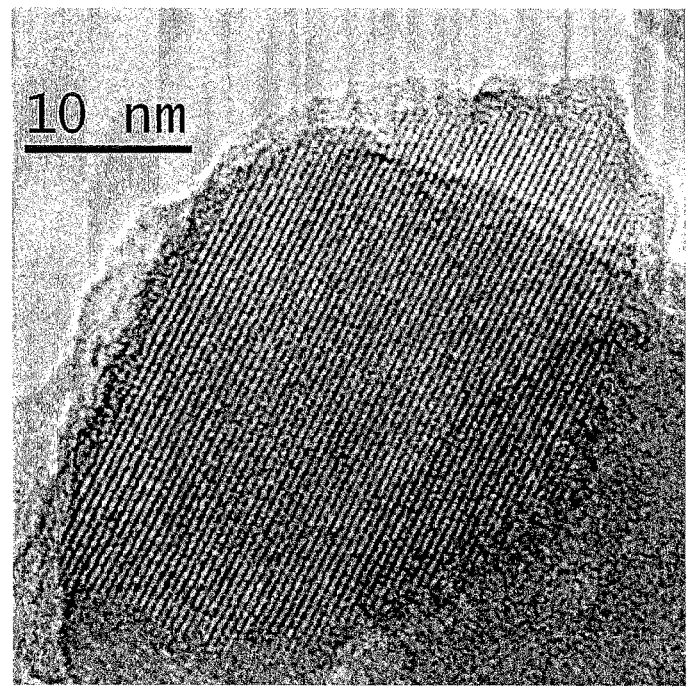
Figure 5:
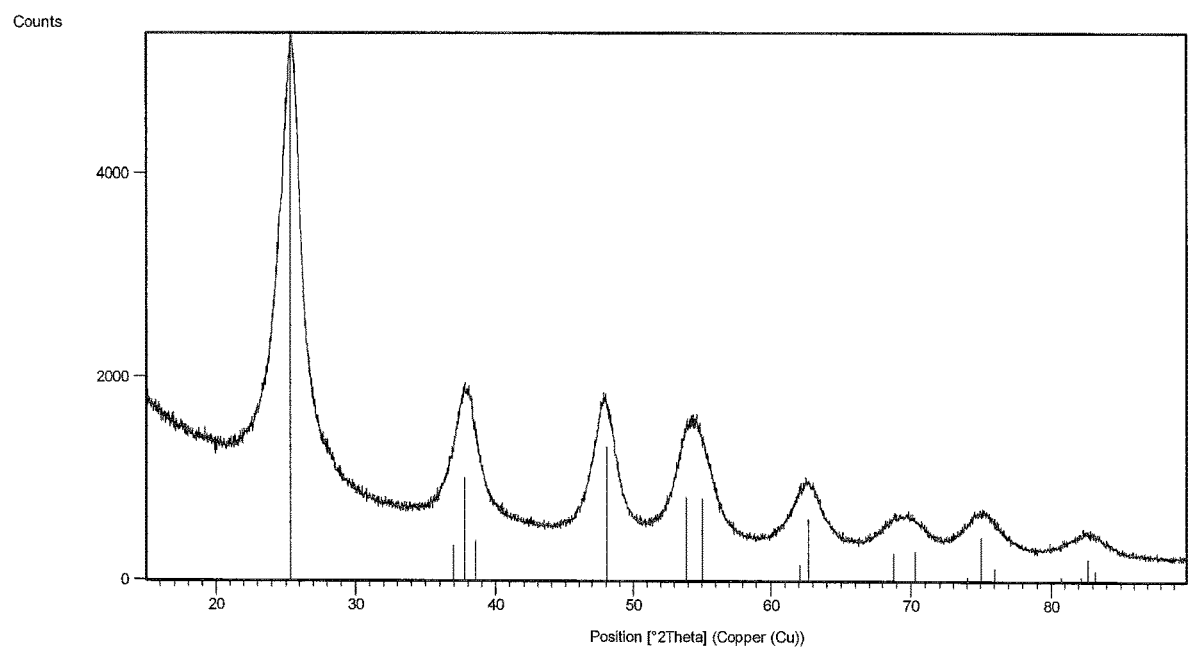
Figure 6:
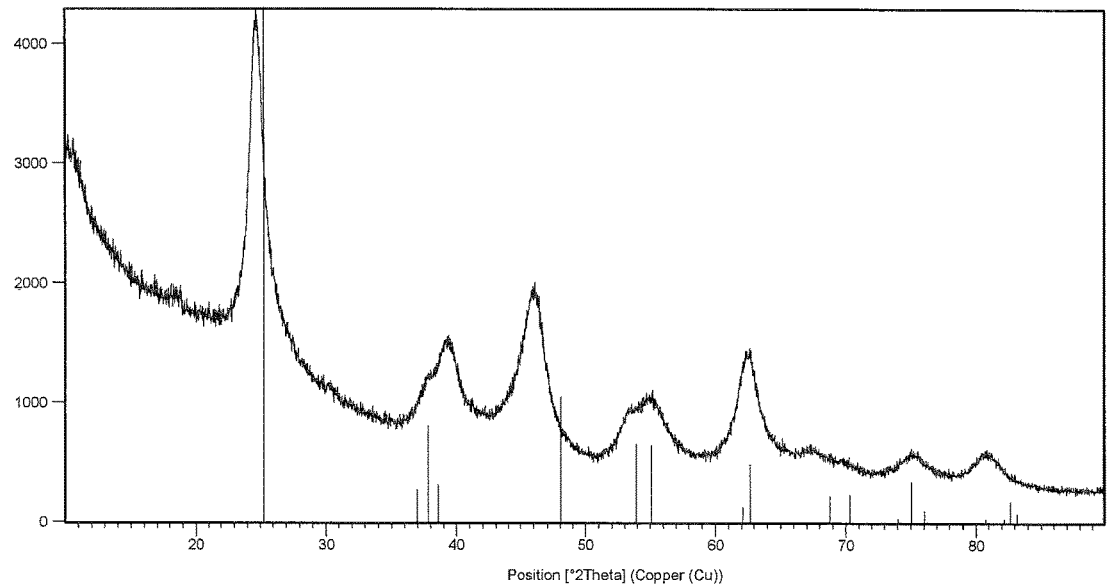
Figure 7:
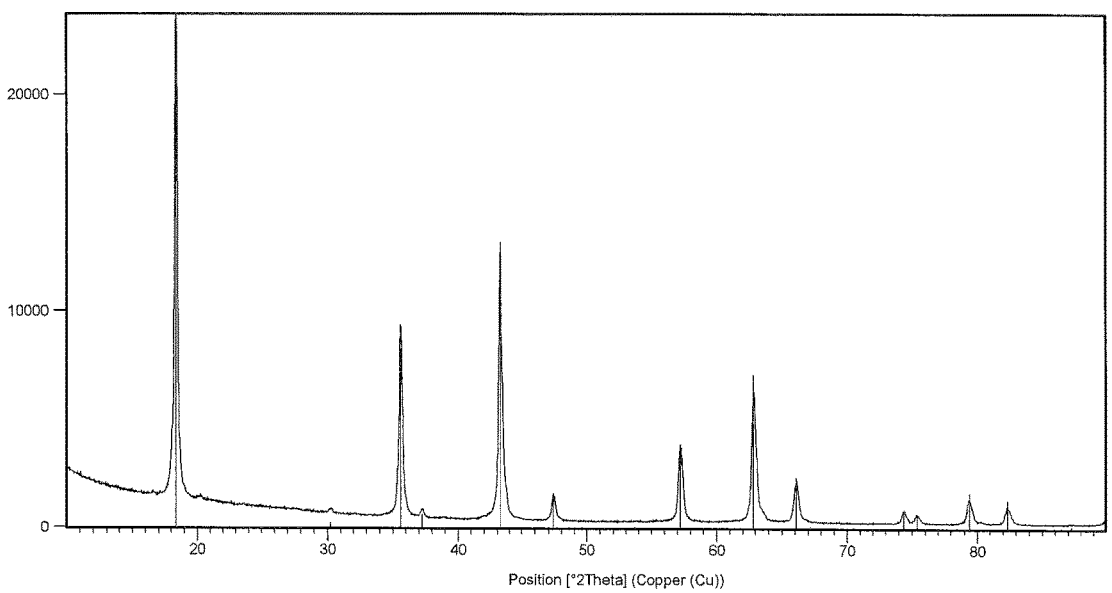
Figure 8:
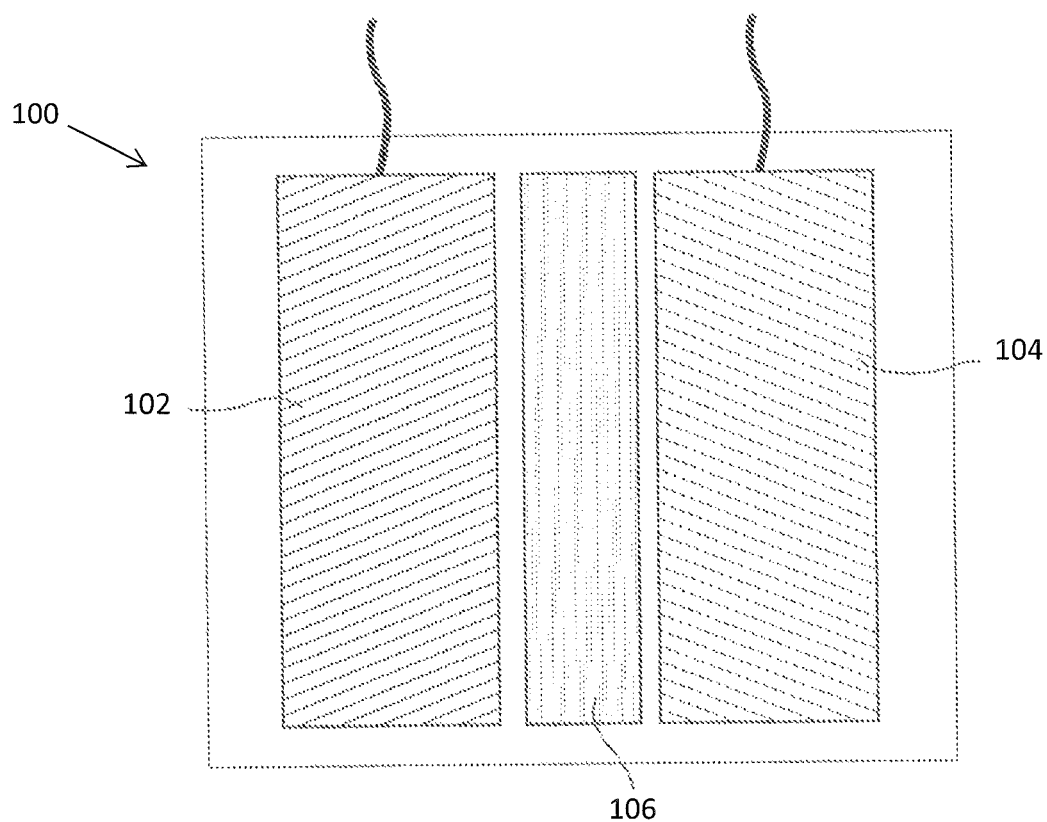

Having thus described the invention in general terms, reference will now be made to the accompanying drawings, which are not necessarily drawn to scale, and wherein:

FIG. 1 is an SEM image of precursor titanium dioxide nanoparticles according to one embodiment of the invention;

FIG. 2 is an SEM image of lithium-inserted titanium dioxide nanoparticles according to one embodiment of the invention;

FIG. 3 is an SEM image of lithium titanate nanoparticles according to one embodiment of the invention;

FIGS. 4A and 4B are TEM images, at different magnifications, of lithium titanate nanoparticles according to one embodiment of the invention;

FIG. 5 is an x-ray diffraction (XRD) pattern for precursor titanium dioxide nanoparticles according to one embodiment of the invention, with standard anatase titanium dioxide pattern bars as reference;

FIG. 6 is an XRD pattern for lithium-inserted titanium dioxide nanoparticles according to one embodiment of the invention, with standard anatase titanium dioxide pattern bars as reference;

FIG. 7 is an XRD pattern for lithium titanate nanoparticles according to one embodiment of the invention, with standard lithium titanate spinel pattern bars as reference; and FIG. 8 is a schematic view of an exemplary lithium-ion battery in which the lithium-inserted titanium dioxide nanoparticles or lithium titanate nanoparticles of the invention could be used as part of an electrode material.

DETAILED DESCRIPTION OF THE INVENTION

The invention now will be described more fully hereinafter through reference to various embodiments. These embodiments are provided so that this disclosure will be thorough and complete, and will fully convey the scope of the invention to those skilled in the art. Indeed, the invention may be embodied in many different forms and should not be construed as limited to the embodiments set forth herein; rather, these embodiments are provided so that this disclosure will satisfy applicable legal requirements. Like numbers refer to like elements throughout. As used in the specification, and in the appended claims, the singular forms "a", "an", "the", include plural referents unless the context clearly dictates otherwise.

I. Titanium Dioxide Precursor Particles

The titanium dioxide ($TiO_2$) precursor particles used in the invention can vary, and in particular, particle size, particle morphology, crystalline polymorph, crystallite size, pore size, and the like can vary in certain embodiments of the invention. The inventive methods described herein could be practiced with both anatase and rutile polymorphs of $TiO_2$, but the anatase crystalline structure is preferred. In certain embodiments, the precursor particles can be characterized as having completely or substantially pure anatase crystalline structure, such as $TiO_2$ particles consisting of greater than about 95% anatase phase.

The particle size of the precursor $TiO_2$ particles is not particularly limited in the present invention. However, ultrafine particles having a narrow particle size distribution are typically preferred for use in electrode applications. Accordingly, in certain embodiments, the precursor $TiO_2$ particles used in the present invention can be characterized as ultrafine or nanoparticles. As used herein, the terms "ultrafine particles" or "nanoparticles" refer to particles with at least one dimension less than 100 nm. Ultrafine particles used in the invention will typically have an average primary particle size of no more than about 100 nm, more often no more than about 80 nm, and in some embodiments, no more than about 50 nm, as determined by visually examining a micrograph of a transmission electron microscopy ("TEM") image or a scanning electron microscopy ("SEM") image, measuring the diameter of the particles in the image, and calculating the average primary particle size of the measured particles based on magnification of the TEM or SEM image. The primary particle size of a particle refers to the smallest diameter sphere that will completely enclose the particle. The above-noted size ranges are average values for particles having a distribution of sizes.

In certain embodiments, the precursor $TiO_2$ particles can be characterized in terms of particle size distribution. In certain embodiments, the particles can be viewed as monodisperse, meaning the particle population is highly uniform in particle size. Certain monodisperse particle populations useful in the present invention can be characterized as consisting of particles having a primary particle size within 20 percent of the average primary particle size for the particle population, or within 15 percent, or within 10 percent (i.e., all particles in the population have a primary particle size within the given percentage range around the average primary particle size). In one exemplary embodiment, the average primary particle size is about 50 nm and all particles in the population have a primary particle size in the range of about 40 to about 60 nm (i.e., within 20 percent of the average primary particle size).

Other particle size ranges could be used without departing from the present invention, such as microparticles having at least one dimension less than 1000 μm (e.g., about 50 μm to about 1000 μm). It is also possible to use mixtures of particles having different average particle sizes within the ranges noted herein (e.g., bimodal particle distributions).

Particle morphology (i.e., shape) of the $TiO_2$ precursor particles can also vary without departing from the invention. In certain embodiments, the precursor particles will have a generally spherical shape. It is preferred for the precursor particles to exhibit highly uniform particle morphology, meaning there is relatively little variance in particle shape within the particle population.

$TiO_2$ particles suitable for use in the present invention can also be characterized by varying crystallite sizes, with an advantageous size range being less than about 20 nm, such as less than about 15 nm, or less than about 12 nm (e.g., about 4 nm to about 12 nm).

The precursor particles can also be characterized by varying pore size distributions, both in terms of intra-particle pores and inter-particle pores, as well as varying surface area. Exemplary intra-particle pores sizes include average pore sizes in the mesopore size range such as about 2 nm to about 12 nm, and exemplary inter-particle pore sizes include average pore size ranges of about 15 nm to about 80 nm. Exemplary average BET specific surface area of precursor particles used in the invention include about 50 $m^2/g$ to about 400 $m^2/g$ (e.g., about 100 to about 300 $m^2/g$ or about 120 to about 250 $m^2/g$). As would be understood by one of ordinary skill in the art, BET specific surface area refers to a specific surface area determined by nitrogen adsorption according to the ASTMD 3663-78 standard based on the Brunauer-Emmett-Teller method described in the periodical "The Journal of the American Chemical Society", 60, 309 (1938). Pore size measurements can also be made using the BET methodology.

In certain embodiments, the precursor $TiO_2$ particles can be characterized in terms of pore size distribution. In certain embodiments, the particles can be viewed as monodisperse in terms of pore size, meaning the particle population is highly uniform in pore size. Certain monodisperse particle populations useful in the present invention can be characterized as consisting of particles having a pore size within 20 percent of the average intra-particle pore size (or inter-particle pore size) for the particle population, or within 15 percent, or within 10 percent (i.e., all particles in the population have a pore size within the given percentage range around the average pore size). In one exemplary embodiment, the average intra-particle pore size is about 10 nm and all particles in the population have a particle size in the range of about 8 to about 12 nm (i.e., within 20 percent of the average pore size).

Suitable $TiO_2$ precursor particles that can be used in the present invention are commercially available from Cristal Global, such as products available under the tradenames Tiona® ATI and CristalACTiV™. Reference is also made to the $TiO_2$ particles and methods of manufacture described in U.S. Pat. No. 4,012,338 to Urwin; U.S. Pat. Publ. Nos. 2005/0175525 to Fu et al.; 2009/0062111 to Fu et al.; and 2009/0324472 to Fu et al., all of which are incorporated by reference herein.

In one embodiment, $TiO_2$ precursor particles are provided as described in U.S. Pat. Publ. No. 2013/0122298 to Fu et al., which is incorporated by reference herein. As generally described therein, $TiO_2$ nanoparticles can be provided by first preparing an aqueous solution of a titanium salt and an organic acid, which works as a morphology controlling agent. $TiO_2$ nanoparticles are formed by thermally hydrolyzing the titanium salt solution at a temperature around 100° C. for a few hours. The nanoparticles can be separated from the mother liquor and used as the precursor material for lithium insertion without first drying the particles. Alternatively, the particles could be dried as described in the above-referenced publication prior to the lithium insertion step. Example 1 below prepares $TiO_2$ nanoparticles according to this general process. Although $TiO_2$ is preferred, it is possible to practice the present invention with other metal oxides. Exemplary alternative metal oxides include silicon oxide (e.g., SiO or $SiO_2$), copper oxide (e.g., CuO or $Cu_2O$), tin oxide, magnesium oxide ($MgO_2$), manganese oxide (e.g., MnO or $Mn_2O_3$), iron oxide (e.g., FeO, $Fe_2O_3$, or $Fe_3O_4$), zirconium oxide, aluminum oxide, vanadium oxide (e.g., VO or $V_2O_3$), molybdenum oxide, cerium oxide, tungsten oxide, zinc oxide, thoria, and the like.

II. Lithium-Inserted Titanium Dioxide Nanoparticles

Lithium-inserted titanium dioxide nanoparticles are formed through a treatment process applied to the above-described $TiO_2$ precursor particles. As used herein, reference to "lithium-inserted" or "lithium-intercalated" particles refers to particles having lithium ions inserted into the crystalline structure of the particle. In the process of the invention, the particle size and morphology of the precursor particles are advantageously maintained, meaning the process through which lithium in introduced does not significantly affect particle size and morphology, thereby providing greater control over such important particle characteristics. Once precursor particles having desired size and morphology characteristics are formed, the present invention allows the formation of lithium-containing particles that essentially mimic the original particles in terms of size and shape.

The lithium insertion process involves hydrothermal treatment of the $TiO_2$ particles in the present of an aqueous solution of a lithium compound. The aqueous solvent is preferably pure water (e.g., deionized water), although mixtures of water as the predominant solvent (e.g., greater than 50% of total weight of solvent, more typically greater than about 75% or greater than about 95%) with other polar co-solvents such as alcohols can be used without departing from the invention. The amount of water used in the mixture is not particularly limited, although it is advantageous to use sufficient water to maintain the lithium compound in dissolved form.

Any lithium compound that is generally soluble and dissociable in water can be used in the solution. Exemplary lithium salts include lithium hydroxide, lithium oxide, lithium chloride, lithium carbonate, lithium acetate, lithium nitrate, and the like. Strongly alkaline lithium compounds such as lithium hydroxide are preferred. Less alkaline lithium compounds are typically used in combination with a strong base (e.g., sodium hydroxide or ammonia) in order to raise the pH of the solution. The pH of the reaction mixture is typically greater than about 9, such as greater than about 10.

The mixture of the aqueous solution of the lithium compound and the $TiO_2$ precursor particles is heat-treated at elevated temperature (i.e., above room temperature) under hydrothermal process conditions. The heating step is typically conducted in a sealed pressure vessel (e.g., an autoclave) such that the process can proceed at elevated temperature and autogenous pressure. Exemplary autoclave equipment useful in the present invention is available from Berghof/America Inc and Parr Instrument Co., and described in U.S. Pat. No. 4,882,128 to Hukvari et al., which is incorporated by reference herein. Operation of such exemplary vessels will be apparent to the skilled artisan.

The temperature applied to the mixture during the hydrothermal treatment can vary. In certain embodiments, the temperature is at least about 80° C., at least about 90° C., at least about 100° C., or at least about 110° C. The temperature will typically not exceed about 160° C., and in some cases will not exceed about 150° C. A typical temperature range is about 80° C. to about 150° C. (e.g., about 100° C. to about 130° C.). As noted above, pressure during the hydrothermal process is typically autogenous, meaning the pressure within the sealed chamber is not externally controlled, but simply results from the heat treatment applied to the chamber. A typical pressure range for the hydrothermal process is about 5 to about 200 psig. A more typical pressure range is about 30 to about 120 psig. In certain embodiments, the pressure applied to the mixture can be characterized as at least about 20 psig, at least about 30 psig, or at least about 40 psig. The elevated pressure experienced by the reaction mixture is important to achieve desired levels of lithium loading within the particles.

The amount of time in which the hydrothermal treatment is applied to the mixture can vary. Typically, the hydrothermal treatment proceeds for at least about 2 hours or at least about 3 hours. The maximum treatment period is not particularly limited, although treatment beyond about 48 hours is typically unnecessary.

The amount of lithium compound used in the mixture will vary and depends in part on the desired level of lithium loading within the particles. The amount of lithium that can be inserted into the precursor particles can vary significantly, with a typical range being about 1 to about 12 weight percent lithium, based on the total weight of the lithium-inserted particles. A more typical range of lithium insertion is about 3% to about 8%. If it is desired to calcine the lithium-inserted particles to form LTO as described more fully below, the lithium loading of the particles should be in the range of about 5 to about 7 weight percent. The amount of lithium compound used in the mixture to achieve a desired lithium loading level is typically about 2% to about 20% by weight lithium versus the weight of titanium dioxide.

As noted previously, the hydrothermal process utilized to insert lithium into the precursor particles leaves the original particle size and morphology largely undisturbed. Thus, the lithium-inserted particles can be characterized has having essentially the same particle size and morphology characteristics noted above in connection with the precursor particles. For example, the characteristics of average particle size, particle size distribution (e.g., monodispersity), intra-particle and inter-particle pore size, pore size distribution (e.g., monodispersity), and particle shape will be largely unchanged by the hydrothermal process. In certain embodiments, any or all of the above-noted characteristics can be viewed as relatively unchanged, meaning one or more of average particle size, particle size distribution (e.g., monodispersity), intra-particle and inter-particle pore size, pore size distribution (e.g., monodispersity), and particle shape of the lithium-inserted particles will be within about 10 percent (e.g., within about 5% or within about 2.5%) of the value for the same characteristic of the precursor particles.

The lithium-inserted titanium dioxide nanoparticles can be characterized by an x-ray diffraction (XRD) pattern that is distinct from the precursor titanium dioxide nanoparticles, which clearly shows that the process of the invention results in diffusion of lithium into the $TiO_2$ crystalline structure. In one embodiment, the lithium-inserted titanium dioxide nanoparticles are characterized by an XRD diffraction pattern substantially as shown in FIG. 6. As shown, lithium-inserted titanium dioxide nanoparticles of the invention will typically exhibit an XRD pattern having peaks at one or more of the following 2-theta diffraction angles: between about 39° and about 40° (e.g., at about 39.5°), between about 45° and about 47° (e.g., at about 46°), and at about 81°.

One skilled in the art will understand that diffraction pattern data should not be construed as absolute and, accordingly, the lithium-inserted titanium dioxide nanoparticles of the invention are not limited to particles having an XRD pattern identical to FIG. 6. Any lithium-inserted titanium dioxide nanoparticles having an XRD pattern substantially the same as FIG. 6 will fall within the scope of the invention. A person skilled in the art of X-ray powder diffraction is able to judge the substantial identity of X-ray powder diffraction patterns. Generally, a measurement error of a diffraction angle in an X-ray powder diffractogram is about 2-theta=0.5° or less (more suitably, about 2-theta=0.2° or less) and such degree of a measurement error should be taken into account when considering the X-ray powder diffraction pattern in FIG. 6 or the peak values provided above. In other words, the peaks in FIG. 6 and the peak values given above can be viewed, in certain embodiments, as being +/−0.5° or +/−0.2°. See Fundamentals of Powder Diffraction and Structural Characterization, Pecharsky and Zavalij, Kluwer Academic Publishers, 2003.

III. Lithium Titanate Nanoparticles

Although the lithium-intercalated nanoparticles prepared according to the process above can be used without further modification as an electrode material, in certain embodiments of the invention, the lithium-intercalated nanoparticles are further processed to form lithium titanate (LTO) particles. The conversion to LTO involves calcining the lithium-intercalated nanoparticles at elevated temperature, such as a temperature of about 400° C. to about 800° C. In certain embodiments, the calcination temperature can be characterized as less than about 650° C., less than about 600° C., or less than about 550° C. The calcination conditions are typically applied for at least about 1 hour or at least about 2 hours (e.g., about 2 to about 8 hours). The maximum treatment period is not particularly limited, although treatment beyond about 12 hours is typically unnecessary.

The calcination process leaves the original particle size and morphology of the lithium-inserted nanoparticles largely undisturbed, although the particles will become more cube-like in shape in agreement with the cubic LTO spinel structure. Thus, the LTO particles can be characterized has having essentially the same particle size and morphology characteristics noted above in connection with the precursor and lithium-inserted particles. For example, the characteristics of average particle size, particle size distribution (e.g., monodispersity), intra-particle and inter-particle pore size, and pore size distribution (e.g., monodispersity) will be largely unchanged by the calcination process. In certain embodiments, any or all of the above-noted characteristics can be viewed as relatively unchanged, meaning one or more of average particle size, particle size distribution (e.g., monodispersity), intra-particle and inter-particle pore size, and pore size distribution (e.g., monodispersity) of the LTO particles will be within about 10 percent (e.g., within about 5% or within about 2.5%) of the value for the same characteristic of the precursor particles and/or the lithium-inserted particles.

IV. Battery Applications

Generally speaking, the lithium-inserted nanoparticles and LTO nanoparticles are ionic conductors and, accordingly, may find use in any application that makes use of materials having ionic conductivity. In one embodiment, the lithium-inserted nanoparticles and LTO nanoparticles can be used as electrode materials in lithium-ion batteries. For example, such materials can be used as part of a battery 100 as schematically depicted in FIG. 8, although the drawing is exemplary only and not intended to limit the scope of the invention to a specific lithium-ion battery configuration. The battery 100 includes an anode 102, a cathode 104, and a separator 106 containing electrolyte. Exemplary lithium-ion batteries that could be adapted for use with the present invention are set forth, for example, in U.S. Patent Publication Nos. 2013/0343983 to Ito et al. and 2013/0337302 to Inagaki et al., both of which are incorporated by reference herein.

In certain embodiments, the lithium-inserted nanoparticles and LTO nanoparticles of the invention are used in the anode of a lithium-ion battery. The anode material for the battery can further include additives such as conductive agents to adjust conductivity of the anode (e.g., graphite, carbon black, or metallic powders), and binders or fillers (e.g., polysaccharides, thermoplastic resins, or elastic polymers). Materials used in the cathode can vary, and examples include lithium manganate, lithium cobaltate, lithium nickelate, vanadium pentoxides, and the like. The electrolyte is typically composed of a lithium salt and a solvent. Exemplary solvents include propylene carbonate, ethylene carbonate, butylene carbonate, dimethyl carbonate, diethyl carbonate, γ-butyrolactone, methyl formate, methyl acetate, tetrahydrofuran, dimethylsulfoxide, formamide, dioxolane, and acetonitrile. Exemplary lithium salts include $LiPF_6$, $LiClO_4$, $LiCF_3SO_3$, $LiN(CF_3SO_2)_2$, and $LiBF_4$.

It is noted that the lithium-inserted nanoparticles and LTO nanoparticles of the invention could also be used as a cathode matrix material in certain battery embodiments, such as lithium-sulfur (Li—S) batteries where the cathode matrix material is intercalated with sulfur.

Aspects of the present invention are more fully illustrated by the following examples, which are set forth to illustrate certain aspects of the present invention and are not construed as limiting thereof.

EXAMPLES

Example 1

Preparation of Lithium Inserted $TiO_2$ Manospheres 1,195 g deionized water, 79 g hydrochloric acid solution (37% from Fisher Scientific), 7.9 g citric acid monohydrate (Alfa Aesar) and 398 g titanium oxychloride solution (25.1% in $TiO_2$, Cristal) were mixed together in a heated reactor equipped with a glass condenser and an overhead stirrer. While being constantly stirred, the mixture was heated to 75° C. and a small amount of anatase $TiO_2$ seeds (0.1% vs. $TiO_2$; anatase seeds were produced by Cristal) was quickly introduced. The reaction was maintained at 75° C. for 2 hours. During this period, $TiO_2$ particles start to form through hydrolysis of titanium oxychloride. The reaction temperature was then increased to 85° C. and maintained for 3 hours at that temperature. The hydrolysis was essentially complete at this stage.

The reaction mixture was cooled to room temperature and stirring was stopped. The $TiO_2$ slurry formed was allowed to settle for about 3 hours. After that, with essentially all of the particles settled to the bottom of the container, the mother liquor was removed and about the same amount of deionized water was added. A small sample was taken and examined under SEM. The SEM image shows the $TiO_2$ particles are uniform, generally spherical in shape, and about 40 nm in size, essentially the same as shown in FIG. 1. A small sample dried in an oven was measured by XRD, which showed that the $TiO_2$ was in anatase form (as shown in FIG. 5). The XRD measurements can be performed with a PANalytical X'Pert Pro Diffractometer using Cu $K\alpha_1$ radiation of λ=1.540 A.

The diffractometer was equipped with a sealed Cu x-ray tube and an X-Celerator position sensitive detector. Instrument conditions were set at 45 kV, 40 mA, 0.016° 2θ/step and 50 second dwell time.

After the sampling, the stirring was restarted and 78.8 g lithium hydroxide monohydrate (Alfa Aesar) was added in small portions. After stirring for about 15 minutes, the mixture was transferred in to a hydrothermal reactor (Parr Instruments) and was treated at 120° C. under autogenous pressure for 24 hours. The reaction was then cooled to room temperature, and the product was separated by filtration and washed by deionized water several times until the filtrate conductivity was lower than 500 μS/cm. The washed sample was dried in an oven at 90° C. SEM measurement showed the particles were still in the form of fairly uniform nanospheres (as shown in FIG. 2). In comparison with the SEM image (e.g., FIG. 1) of the precursor nanoparticles used for the insertion, one can conclude that the nanoparticles are kept intact after the insertion and particle morphology has not been changed during the treatment. XRD measurement showed the $TiO_2$ was still in anatase form, although with most of the peaks significantly shifted (as shown in FIG. 6). Lithium analysis, using ICP—OES (Inductively Coupled Plasma—Optical Emission Spectrometry) analysis (Thermo Scientific iCAP 6000), showed the product contained about 6 wt % of Li, which evidenced that the XRD peak shift was caused by lithium insertion into the $TiO_2$ crystal lattices. The lithium-inserted $TiO_2$ sample was first dissolved in a hydrofluoric acid solution before measurement. Lithium standard solutions were purchased from High-Purity Standards, Inc.

Example 2

Conversion of Lithium Inserted $TiO_2$ to Lithium Titanate Spinel (LTO)

The lithium-inserted $TiO_2$ nanospheres from Example 1 were treated in a furnace at 600° C. for 6 hours. The SEM image showed that the nanoparticles after the conversion were still largely spherical and the original morphologic features were largely maintained (as shown in FIG. 3).

High magnification TEM images showed that the nanoparticles were cube-like in shape in agreement with the cubic spinel structure (as shown in FIGS. 4A and 4B). The XRD pattern of the nanoparticles (shown in FIG. 7) matched completely with the standard cubic spinel lithium titanate ($Li_4Ti_5O_{12}$).

Many modifications and other embodiments of the invention will come to mind to one skilled in the art to which this invention pertains having the benefit of the teachings presented in the foregoing descriptions and associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for preparing lithium titanate spinel nanoparticles suitable for use in an electrode of a battery, comprising:
    a) forming a mixture comprising titanium dioxide precursor particles and an aqueous solution of a lithium compound;
    b) heating the mixture at elevated temperature in a sealed pressure vessel in order to form lithium-inserted titanium dioxide particles, wherein at least one particle size characteristic selected from the group consisting of average primary particle size, average intra-particle pore size, average inter-particle pore size, is within 10 percent of the same size characteristic of the precursor particles after by said heating step; and
    c) calcining the lithium-inserted titanium dioxide particles to form the lithium titanate spinel nanoparticles,
    wherein the lithium titanate spinel nanoparticles are characterized by all of the following:
        a monodisperse intra-particle pore size distribution with an intra-particle pore size in the mesopore range and an average intra-particle pore size within about 10 percent of the same size characteristic of the titanium dioxide precursor particles;
        a monodisperse particle size distribution within about 10 percent of the same size characteristic of the titanium dioxide precursor particles; and
        an inter-particle pore size within about 10 percent of the same size characteristic of the titanium dioxide precursor particles,
    wherein the titanium dioxide precursor particles have:
        a primary particle size in the range of about 40 to about 60 nm with a monodisperse particles size distribution defined as all particles having a primary size within 20% of the average particle size;
        a monodisperse intra-particle pore size distribution with an intra-particle pore size in the mesoporous range from about 2 nm to about 12 nm; and
        an inter-particle pore size of about 15 nm to about 80 nm.

2. The method of claim 1, wherein the lithium compound is selected from the group consisting of lithium hydroxide, lithium oxide, lithium chloride, lithium carbonate, lithium acetate, lithium nitrate, and combinations thereof.

3. The method of claim 1, wherein the elevated temperature is at least about 80° C. and the pressure during the heating step is autogenous.

4. The method of claim 1, wherein the pH of the mixture is greater than about 9.

5. The method of claim 1, wherein the pressure applied to the mixture during the heating step is at least about 20 psig.

6. The method of claim 1, wherein the amount of lithium compound in the mixture is between about 2 and about 20 weight percent based on the weight of the titanium dioxide precursor particles.

7. The method of claim 1, wherein the calcining step comprises heating the lithium-inserted titanium dioxide particles at a temperature of no more than about 650° C.

8. Lithium titanate spinel nanoparticles having:
    a monodisperse intra-particle pore size distribution with an intra-particle pore size in the mesoporous range of from about 2 nm to about 12 nm;
    a monodisperse particle size distribution defined as all particles having a primary size within 20% of the average particle size; and
    an inter-particle pore size of about 15 nm to about 80 nm,
    wherein the monodisperse particle size distribution and the inter-particle pore size are both within about 10 percent of the same size characteristic of titanium dioxide precursor particles; and
    wherein the titanium dioxide precursor particles have a primary particle size in the range of about 40 to about 60 nm.

9. The lithium titanate spinel nanoparticles of claim 8, wherein the nanoparticles have an average primary particle size of no more than about 50 nm and a monodispersity of particle size such that all particles have a primary particle size within about 10 percent of the average primary particle size.

10. A battery comprising a first electrode, a second electrode, and a separator comprising an electrolyte between the first and second electrodes, wherein one of the first and second electrodes comprises lithium titanate spinel nanoparticles according to claim 8.

11. The lithium titanate spinel nanoparticles of claim 8, wherein the monodisperse particle size distribution is within about 5 percent of the same size characteristic of the titanium dioxide precursor particles.

12. The lithium titanate spinel nanoparticles of claim 8, wherein the monodisperse particle size distribution is within about 2.5 percent of the same size characteristic of titanium dioxide precursor particles.

13. The lithium titanate spinel nanoparticles of claim 8, wherein the titanium dioxide precursor particles have a primary particle in the range of about 50 nm.

14. The battery of claim 10, wherein the monodisperse particle size distribution is within about 5 percent of the same size characteristic of the titanium dioxide precursor particles.

15. The battery of claim 10, wherein the monodisperse particle size distribution is within about 2.5 percent of the same size characteristic of the titanium dioxide precursor particles.

16. The lithium titanate spinel nanoparticles of claim 8, wherein the nanoparticles have a cube-like shape in agreement with a cubic lithium titanate spinel structure.

17. Lithium titanate spinel nanoparticles having:
 a monodisperse intra-particle pore size distribution with an intra-particle pore size in the mesoporous range and an average intra-particle pore size within about 10 percent of the same size characteristic of titanium dioxide precursor particles from which the lithium titanate spinel nanoparticles are formed;
 a monodisperse particle size distribution within about 10 percent of the same size characteristic of the titanium dioxide precursor particles; and
 an inter-particle pore size within about 10 percent of the same size characteristic of the titanium dioxide precursor particles; and
 wherein the titanium dioxide precursor particles have:
  a primary particle size in the range of about 40 to about 60 nm with a monodisperse particles size distribution defined as all particles having a primary size within 20% of the average particle size:
  a monodisperse intra-particle pore size distribution with an intra-particle pore size in the mesoporous range from about 2 nm to about 12 nm; and
  an inter-particle pore size of about 15 nm to about 80 nm.

18. The lithium titanate spinel nanoparticles of claim 17, wherein the titanium dioxide precursor particles have an average primary particle size of no more than about 50 nm.

19. The lithium titanate spinel nanoparticles of claim 17, wherein the monodisperse particle size distribution of the nanoparticles is within about 5 percent of the same size characteristic of the titanium dioxide precursor particles.

20. The lithium titanate spinel nanoparticles of claim 17, wherein the monodisperse particle size distribution of the nanoparticles is within about 2.5 percent of the same size characteristic of titanium dioxide precursor particles.

21. A battery comprising a first electrode, a second electrode, and a separator comprising an electrolyte between the first and second electrodes, wherein one of the first and second electrodes comprises lithium titanate spinel nanoparticles according to claim 17.

22. The battery of claim 21, wherein the monodisperse particle size distribution of the nanoparticles is within about 5 percent of the same size characteristic of the titanium dioxide precursor particles.

23. The battery of claim 21, wherein the monodisperse particle size distribution of the nanoparticles is within about 2.5 percent of the same size characteristic of the titanium dioxide precursor particles.

\* \* \* \* \*